United States Patent [19]

Robin

[11] 4,335,467
[45] Jun. 15, 1982

[54] LIQUID METAL COOLED NUCLEAR REACTOR

[75] Inventor: Marcel Robin, Sevres, France

[73] Assignee: Commissariat a l'Energie Atomique, Paris, France

[21] Appl. No.: 51,520

[22] Filed: Jun. 22, 1979

[30] Foreign Application Priority Data

Jun. 23, 1978 [FR] France ............... 78 18821

[51] Int. Cl.³ .................................. G21C 9/00
[52] U.S. Cl. ........................... 376/285; 308/174
[58] Field of Search ............ 176/38, 40, 65, 62, 176/63, 87; 308/174, 227, 231

[56] References Cited

U.S. PATENT DOCUMENTS

| | | | |
|---|---|---|---|
| 3,182,002 | 5/1965 | Laithwaite et al. | 176/65 |
| 3,185,631 | 5/1965 | Long et al. | 176/65 |
| 3,260,649 | 7/1966 | Jens et al. | 176/40 |
| 3,304,137 | 2/1967 | Strassberg | 308/174 |
| 3,652,141 | 3/1972 | Husten et al. | 308/174 |
| 3,716,451 | 2/1973 | Sickel et al. | 176/65 |
| 3,771,499 | 11/1973 | Marroni, Jr. et al. | 176/87 |
| 3,775,250 | 11/1973 | Scholz et al. | 176/87 |
| 4,064,005 | 12/1977 | Baujat | 176/87 |
| 4,115,194 | 9/1978 | Butti | 176/38 |
| 4,126,361 | 11/1978 | Bottner et al. | 308/174 |

FOREIGN PATENT DOCUMENTS

| | | | |
|---|---|---|---|
| 2021031 | 8/1971 | Fed. Rep. of Germany | 176/38 |
| 2619351 | 11/1977 | Fed. Rep. of Germany | 176/87 |
| 2636251 | 2/1978 | Fed. Rep. of Germany | 176/87 |
| 1215776 | 4/1960 | France | 176/87 |
| 1463590 | 11/1966 | France | 176/65 |
| 51-21114 | 6/1976 | Japan | 176/87 |
| 880092 | 10/1961 | United Kingdom | 176/87 |

Primary Examiner—Harvey E. Behrend
Attorney, Agent, or Firm—Michael N. Meller; Anthony H. Handal

[57] ABSTRACT

A liquid metal reactor comprising a vessel containing the core and liquid metal, at least one heat exchanger ensuring a heat-exchange between said liquid metal and a second fluid, a first duct connecting said vessel with the inlet of said exchanger and a second duct connecting said vessel with the outlet of said exchanger. Means are provided for restricting the movement of said exchanger in two directions perpendicular to the direction of said first duct.

3 Claims, 5 Drawing Figures

LIQUID METAL COOLED NUCLEAR REACTOR

The present invention relates to liquid metal cooled nuclear reactors.

More specifically, the invention relates to such a reactor of the type with cooling loops. It is well known that there exist two main categories of fast neutron reactors (or fast reactors), viz. those with loops, on the one hand, and those of the so-called "integrated" type, on the other hand.

In the latter category, the so-called main vessel contains an inner vessel, or primary vessel, the principal function of which is to separate the hot liquid metal issuing from the core from the cold liquid metal issuing from the pumps and exchangers and fed into said core.

Said reactors are said to be "integrated", in view of the fact that the core neutronic protective means, the primary pumps and the primary exchangers are all contained in the vessel.

A second liquid metal circuit (secondary circuit) is adapted to transfer the heat of the liquid metal primary circuit to a water-steam circuit for feeding the electric power generating turbines.

It will be readily understood that, in such a case, the main vessel must be bulky, which substantially increases the manufacturing cost as well as the cost of the liquid metal forming the coolant material.

In the first category, i.e. the reactors with cooling loop, the vessel, in practice morely contains the core and the liquid metal for cooling same, whereas the pumps, the primary exchangers and the connecting ducts are all outside said vessel. Each heat-exchanger is connected to the vessel by means of piping for feeding cold liquid metal at the bottom of the core, on the one hand, and for the exhaust of the hot liquid metal from said core.

It can be easily understood that, in said first category, the vessel may be much smaller, which decreases the weight thereof as well as the requested amount of liquid metal, but, on the other hand, since the exchangers and the primary pumps are outside the vessel, it is necessary to resort to pipes provided with curved portions allowing their free expansion under thermal stresses, which renders the whole installation more cumbersome.

The present invention relates to said first category of reactors and, more specifically, to the problem of connecting the vessel with a heat-exchanger via the outlet primary duct with a view to restricting the mechanical stresses due to temperature and to decreasing the length of the ducts in order to render the whole installation less cumbersome.

Still preferably, but by no means exclusively, the present invention relates to the portion of the nuclear installation in a specific type of reactors with loops, viz. the so-called semi-integrated reactors. More precisely, the latter reactors are fast reactors, the heat-exchangers and pumps of which are outside the vessel, but in which (as in reactors of the "integrated" type), a main vessel contains a primary inner vessel for separating the cold liquid metal from the hot liquid metal, said inner vessel being submitted but to a restricted irradiation in view of the fact that the core is surrounded by neutronic protection means.

According to a still more particular embodiment the present invention relates to a semi-integrated nuclear reactor devoid of liquid metal secondary circuit. In other words, in the primary exhangers, the primary liquid metal issuing from the core is in direct heat-exchange with the water/steam fluid that feeds the turbines. These exchangers are, of course, of a very special type so as to meet the safety requirements linked to the direct heat-exchange between the primary liquid metal and the water/steam fluid. Embodiments of such exchangers are described in French Patent application No. 77 03192 of Feb. 4, 1977 for a "Pump-exchanger assembly", filed in the name of the applicant. In addition, in such exchangers, the pump is integrated to the exchanger so as to eliminate the connecting duct between the two devices.

In addition to the problem of thermal stresses in the connections between the vessel and the exchangers, account has also to be taken of the necessity to balance said exchangers so that they can withstand earthquake shocks of reasonable amplitude in situ.

In the prior art, several approaches to the problem of thermal stresses were made, e.g. in British Pat. No. 985,463, except however as regards the consequences of earth tremors. In the above patent, indeed, in which is described a liquid metal cooled reactor with loops, the connection between the vessel and the heat-exchangers is ensured by coaxial whereas said vessel and conduits are supported in the horizontal plane containing the common axis of said conduits.

The support of the tanks containing the exchangers is obtained via annular supporting members, resting on roller bearings and allowing movements in the direction of the common axis of the conduits, whenever a thermal expansion occurs.

Such an arrangement, however, has the severe drawback of solving only the problem of the absorption of the movements of the exchangers in the direction of the coaxial conduits, the risk of earth-tremors not being contemplated; on the other hand, said coaxial conduits do not permit, along the liquid metal path, to mount safety valves that would allow to regulate the flow-rates and, in some cases of emergency, to isolate one of the exchangers without stopping the reactor operation.

The object of the present invention is to provide a nuclear reactor capable of solving all the above problems, while affording a safer operation, in particular by providing means for supporting the exchangers in such a manner that the movements of the latter be restricted.

Said reactor is mainly characterized in that it comprises:

a vessel adapted to receive the reactor core and said liquid metal;

at least one heat-exchanger adapted to ensure a heat-exchange between said liquid metal and a second fluid, a first duct adapted to connect said vessel with the inlet of the, or of one of the, heat-exchangers, said duct opening into said vessel above the core;

a second duct adapted to connect said vessel with the outlet of said, or of one of said, heat-exchangers, said vessel being provided, along the outer periphery thereof, with so-called first supporting means situated at a determined level, said first duct being substantially rectilinear and horizontal and opening into said vessel above, and in the vicinity of, said first supporting means, the, or each, heat-exchanger being provided with so-called second supporting means at a level that it only slightly differs from said determined level and so selected as to minimize the stresses resulting from differential expansions of the ducts, said second supporting means being such as to allow said exchanger to move in the horizontal direction of said first duct, said second supporting means further comprising means for restricting the movements of said exchanger in the two directions perpendicular to the direction of said duct, said two directions being at right angles to each other.

It will be readily understood that the exchanger is thus allowed to move freely so as to absorb any thermal expansion of the hot liquid metal outlet duct and of the vessel, between the filling temperature of the vessel (viz. about 150° C.) and the temperature of the hot liquid metal (viz. about 530°C.), under normal operation. Morever, in order to restrain the exchanger from unacceptably moving, for instance in case of earth tremors, said second supporting means comprise means for restricting the movements of said exchanger along two directions at right angles to that of said duct, said two directions being at right angles to each other.

Finally, due to the use, of two separate ducts, viz. one for the "cold" metal and the other for the hot metal, at two different levels, to connect the vessel to each exchanger, the problems of expansion can be more readily controlled. In such a case, the relative position of the exchanger and the vessel is determined by the hot duct exclusively and, this time, the exchanger is supported at a level different from that at which the vessel is supported and calculated in such manner that the torque exerted on said exchanger by the combination of the two ducts be minimized. In addition, since two separate ducts are provided, they can be different from each other: most frequently, it is preferable that the hot conduit be rectilinear and that the "cold" conduit be provided with elbows; finally, safety valves as well as insulating valves are mounted on said conduits, so that, if necessary, each exchanger may operate at its own rate, and even be momentarily isolated from the reactor, which is a substantial advantage, as regards the reactor safety, with respect to the prior art methods, such as disclosed, e.g., in British Pat. No. 985,463.

Conveniently, the centers of gravity of the assembly formed by the reactor, the main vessel and the contents thereof, and of the exchanger-pump assembly are situated lower than their supporting levels, which permits to improve the stability of each of said assemblies.

Preferably, the nuclear reactor is of the semi-integrated type and it is characterized in that said vessel comprises a so-called main outer vessel provided with said first supporting means, a so-called primary inner vessel, coaxial with the outer vessel, said inner vessel containing the core and being provided with so-called third supporting means constituted by a ring integral with the main vessel inner wall and supporting a further ring integral with the primary vessel outer wall, said third supporting means being at a determined level, in that said first duct opens into said primary vessel above said core and passes through the annular space between said main vessel and said primary vessel, and in that said second duct opens into said annular space under a horizontal partition provided in said annular space.

Still preferably, the or each of the heat-exchangers comprises integrated means for causing said liquid metal to circulate in the exchanger, in said ducts and through said core.

According to a preferred embodiment, the means for supporting the heat-exchanger are constituted by at least two supporting members diametrically opposed with respect to the vertical axis of the exchanger outer cover, each of said supporting members comprising a horizontal fixed support plate, a horizontal backing plate integral with said exchanger and situated above said support plate, and a first plurality of rollers between said plates, the axes of revolution of said rollers being at right angles to the direction of said tubing.

Other features of the present invention will appear from the following description, given merely by way of example, of an embodiment, with respect to the accompanying drawing, wherein FIG. 1 is a diagrammatic view, in elevation and in section, of the main members of a semi-integrated reactor according to the invention, FIG. 2 is a vertical view, partially in section, of the upper portion of a heat-exchanger, showing the supporting device;

The invention will be described hereinafter with respect to a typical variant of a semi-integrated fast reactor. It is, however, to be noted that the features concerning the connection between the reactor vessel and the, or each, exchanger could be applied as well to fast or thermal neutron reactors with cooling loops, since, in the latter case, the same expansion problems concerning the outlet duct ant the vessel are raised and similar solutions might be adopted.

Figure 1:
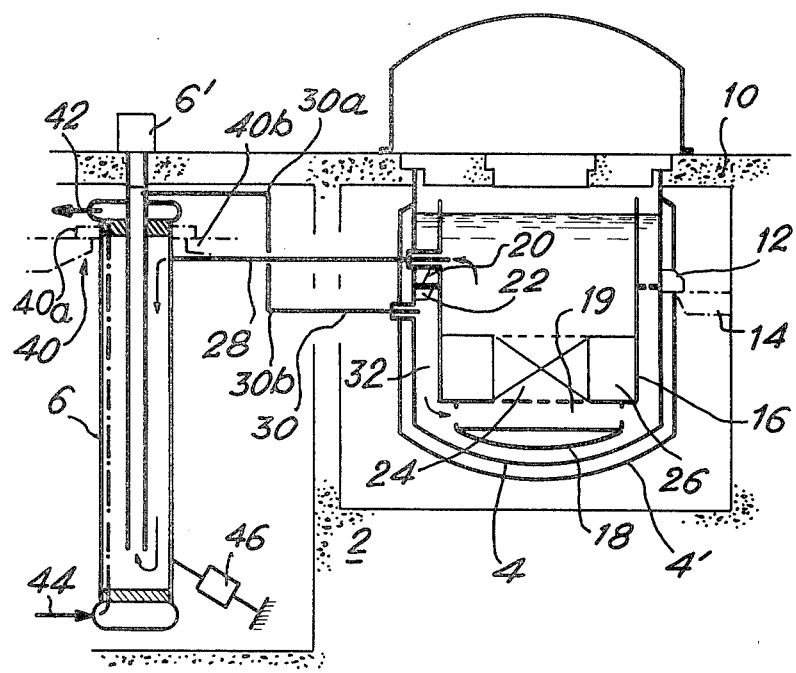
Figure 2:
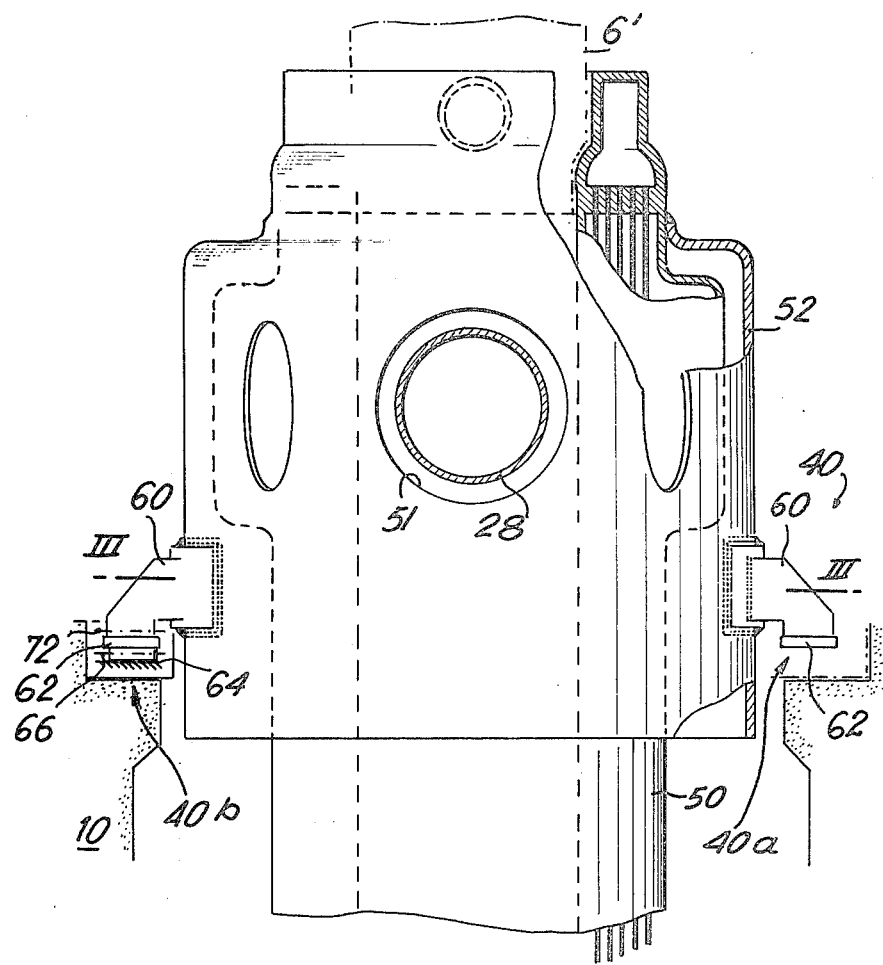
Figure 3:
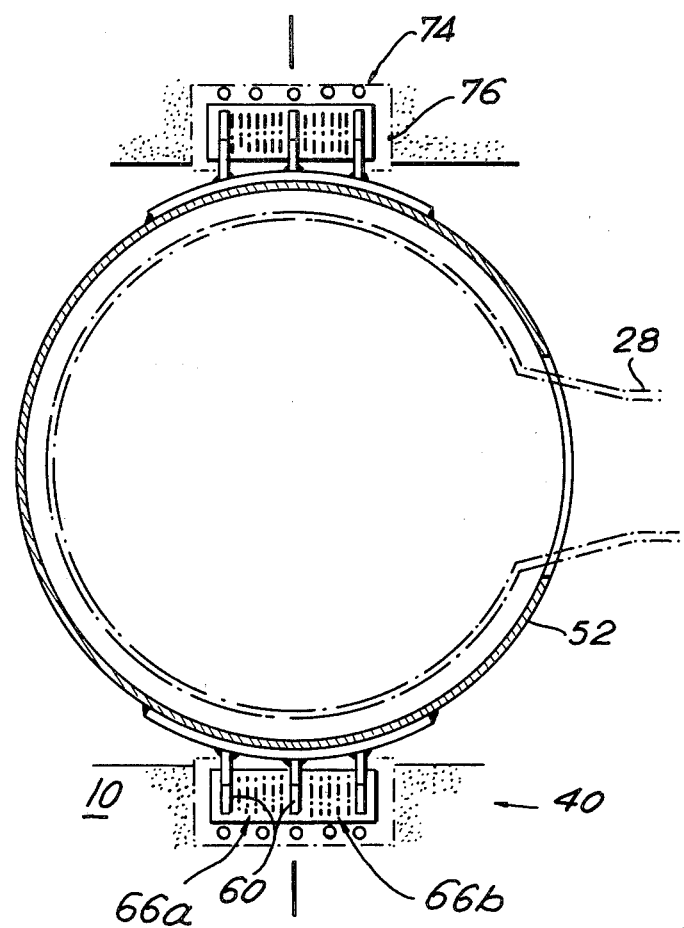
FIG. 3 is a horizontal cross-section along plane 3—3 of FIG. 2.
Figure 4:
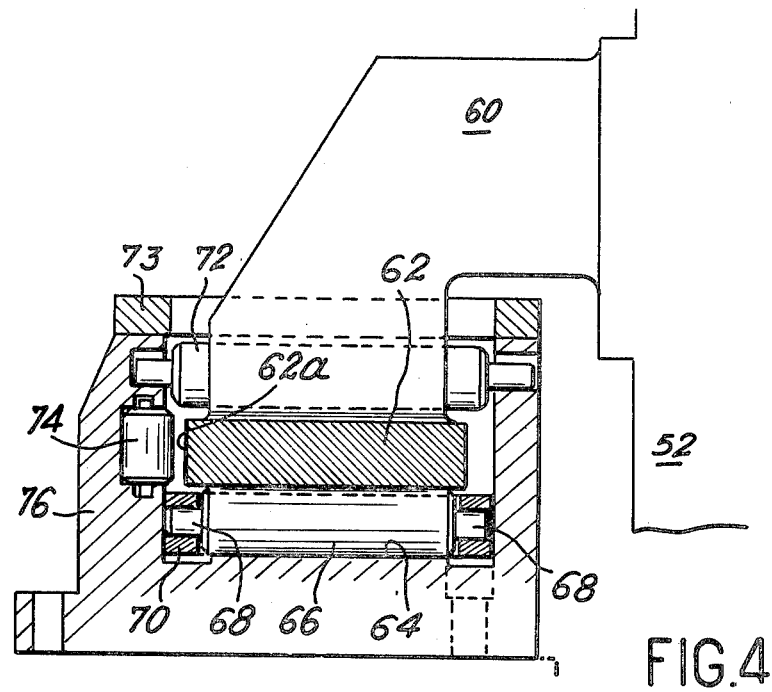
FIG. 4 is a detail view, in vertical section, of a supporting member of the heat-exchanger.
Figure 5:
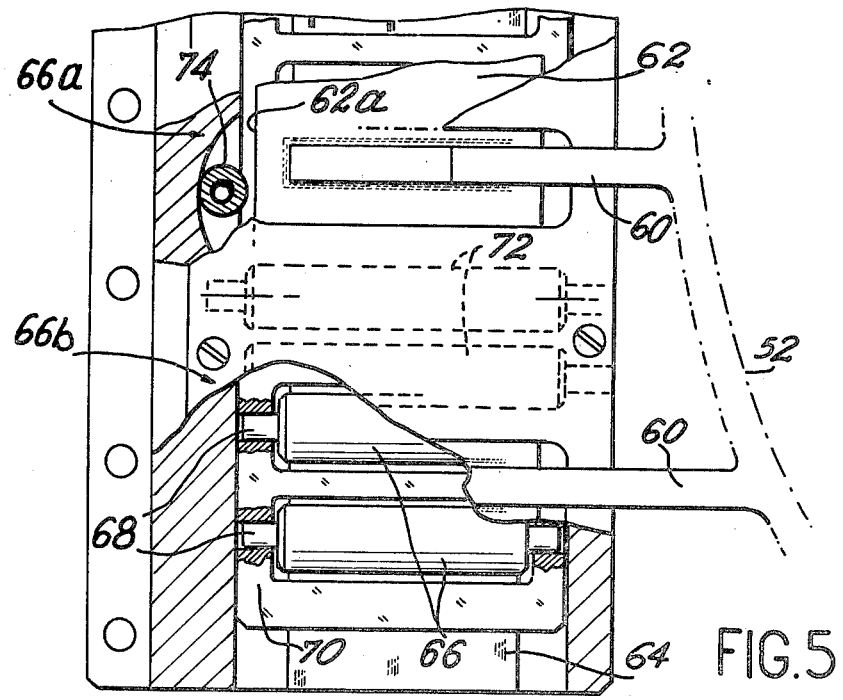
FIG. 5 is a detail view, in partial horizontal section, of a supporting member of the heat-exchanger.

FIG. 1 diagrammatically represents the main elements of the reactor. Inside a concrete enclosure 2 are to be found the reactor main vessel 4 with its safety shell and a heat-exchanger 6 with its shell for the retention of sodium leaks. It is, of course, to be understood that the reactor might comprise several cooling loops, comprising each a heat-exchanger 6 associated to vessel 4. In the specific example disclosed, heat-exchanger 6 ensures the heat-exchange directly between the liquid metal issuing from vessel 4 and the water-steam fluid. Quite obviously it would not be going beyond the scope of the invention to use exchanger 6 for ensuring a heat-exchange between the sodium issuing from the vessel (viz. the primary sodium, in the present instance) and secondary sodium. Moreover, with a view to rendering the whole plant less cumbersome, pump 6' for the circulation of liquid metal is integrated to the heat-exchanger.

The so-called main vessel 4 is supported by supporting peripheral flanges or brackets such as 12 resting on supporting members 14 connected to concrete structure 2. The vessel is closed by a roof slab 4a resting on the upper peripheral flange of main vessel 4. The latter contains a primary vessel 16 coaxial therewith provided with a bottom portion 18. Said primary vessel 16 is provided, along its periphery, with supporting members 20 adapted to cooperate with supporting members 22 integral with the main vessel inner surface.

It is to be noted that the supporting members of the main vessel and of the primary vessel are substantially in the same horizontal plane.

Inside primary vessel 16 are to be found core 24 resting on diagrid 19, together with the neutronic lateral protective means 26.

The liquid metal circulation between vessel 4 and exchanger 6 is achieved by means of an outlet conduit 28 adapted to connect the inside of primary vessel 16 with the inlet of exchanger 6, and of a liquid metal inlet duct 30 adapted to connect the heat-exchanger integrated pump outlet with the annular space 32 defined by the primary vessel and the main vessel. It should be noted that duct 28, in which flows a hot liquid metal that has passed through the core, passes through annular space 32. The fuel handling devices and the reactor control devices are of known types and, therefore, are not shown in the diagrammatic view. These various component parts are such that the reactor center of gravity be at a lower level than supporting means 12.

According to the invention, and as shown in FIG. 1 in simplified form, steam generator 6 is supported by supporting means 40 integral with concrete enclosure 10. These supporting means 40 allow the generator to move freely in the direction of the axis of duct 28 due to the expansion of said duct and of the vessel. Of course, in addition to ducts 28 and 30 connecting heat-exchanger 6 with vessel 4, ducts relating to the exchanger secondary circuit, and diagrammatically shown at 42 and 44, are also provided.

According to the preferred embodiment, the latter ducts (42,44) are water-vapour ducts.

In a conventional exchanger, these ducts would be used for the circulation of the secondary liquid metal.

It is important to note that, in all cases, it is indeed in duct 28 for hot active sodium that it is intended to minimize the stresses resulting from expansion or generated by earth tremors. Indeed, in return duct 30 flows a liquid metal that is "colder" by about 200° C., which limits the temperature differentials between standstill and normal operation and, in addition, allows the metal to be submitted to higher stresses.

It is to be noted that duct 30 is provided with elbows 30a, 30b giving thereto the requested flexibility. As regards ducts 42 and 44, the fluids they carry, whether it is secondary liquid metal or steam water, are not radioactive, so that the problems of expansion can be solved by the conventional methods, and all the more easily as said ducts are, along a major portion of their length, outside the radioactive protection zone.

It is also to be noted that the level of the supporting-plane of the pump-exchanger assembly 6 determined by supporting members 40 is only slightly different from the levels of the supporting planes of the main vessel and of the primary vessel determined by supporting elements 14 and 22, the spacing between said levels being appropriately selected by calculation so as to minimize the stresses generated by the reactions of the "hot" duct and of the "cold" duct that open into the vessel as well as to the pump-exchanger assemblies at different levels.

Indeed, as disclosed in French Pat. No. 78 18823 in the name of the applicant, tubing 28 is attached to the main vessel, whereas tubing 28 is extended between the main vessel and the primary vessel by separate fittings. In other words, the difference between the displacements resulting from thermal expansions in the vessel portion between supporting member 22 and the junction of tubing 28 with vessel 4, on the one hand, and in the shell portion between the extremity of the junction of tubing 28 with the exchanger inlet and supporting device 40, on the other hand, is negligible since the heights of said vessel portion and of said shell portion are rather small.

Accordingly, the stresses resulting from the reactions of the piping on the main vessel and on the pump-exchanger assembly will readily assume acceptable values for the various temperature distributions. As explained in the above-mentioned patent, the main vessel, in that zone, is cooled by colder liquid metal. As will be explained later on, the exchanger containing the primary pump is supported by a member that is rather cold with respect to the liquid metal flowing in the exchanger. The effect of expansion variations in the vertical direction can thus be rendered substantially negligible. As shown in FIG. 1, damping jacks 46 integral with the concrete wall are attached to the lower portion of the exchanger outer shell. The function of these jacks is to damp out the oscillations likely tube imparted to the exchanger in the case of earth tremors, the exchanger center of gravity being, of course, at a lower level than the exchanger supporting plane.

With reference to FIGS. 2 to 5, the following description will explain in more detail how the supporting device of the, or of each, exchanger is operated to allow the movements of said exchanger or exchangers in the direction of the axis of duct 28. The upper portion of the heat-exchanger outer shell 50 is surrounded by a sleeve 52, the upper extremity of which is fixed to outer shell 50. Said sleeve 52 is capable of withstanding the overall weight of the exchanger. Said sleeve 52 is, of course, at a temperature substantially lower than that of shell 50, the latter being provided with an outer heat-insulator (not shown).

In the example described, the exchanger support is obtained through two supporting members, both of which are designated by reference numeral 40; of course, a portion 40a of each supporting member is integral with sleeve 52 (and, accordingly, with the exchanger), whereas another portion 40b is integral with concrete block 2.

A notch 51 permits duct 28 to pass through sleeve 52.

Portion 40a comprises a lug 60 arranged along a radius of sleeve 52 and welded or bolted to said sleeve. A so-called horizontal "backing plate" is rigidly fixed to its free end.

Portion 40b comprises a horizontal supporting plate 64 anchored to concrete block 10, said plate 64 being situated under plate 62. Between these two plates is mounted a first series of cylindrical rollers 66 having horizontal axes. More specifically, the horizontal axes of rollers 66 are at right angles to the axis of duct 28. The extremities 68 of said rollers are conventionally retained in a cage 70, so that the various rollers form a solid assembly. It can thus be easily understood that, when backing-plate 62 moves horizontally with respect to supporting plate 64 as a result of the expansion undergone by the main vessel, duct 28 and the exchanger shell 50, a rolling movement of rollers 66 with respect to both plane surfaces is obtained. Thus, the free expansion of the various parts as a result of thermal stresses is not accompanied by any substantial mechanical stress. In fact, two sets of rollers (66a, 66b) are provided, which increases the resistance to the stresses applied.

By way of example, it can be mentiond that, in the variant under examination, the normal temperature of the hot liquid metal is in the vicinity of 530° C., whereas the temperature of the liquid metal at the moment of filling the vessel is in the vicinity of 150° C., which, as regards the 1200 MW reactor described, results in a displacement of the pump-exchanger assembly of about 125 mm with respect to its position at the mounting temperature. Such a displacement, in the absence of the appropriate device, would lead to high stresses in duct 28.

In addition, each supporting member is provided with means adapted to prevent any movement of the exchanger, e.g. in case of earth tremors.

In this respect, it is to be noted that the pump-exchanger assembly 6 weighs about 265 metric tons, so that, under such conditions as earth tremors, the amount of energy involved might be considerable and, thus, lead to unacceptable movements and stresses.

With a view to counteracting the consequences of earth tremors, each supporting member comprises a second series of rollers 72 with their horizontal axes in parallel relationship with the axes of rollers 66. These rollers 72 are bound to supporting plate 64 and so mounted that, in normal operation, there be no contact between the upper surface of plate 62 and said rollers 72. The latter are put in action only in case of earth tremors, for counteracting any substantial tilting or rising movements of the heat-exchanger. In fact, a horizontal upper plate 73 is made integral with the supporting plate, and, should the exchanger be unexpectedly caused to tilt, thus raising plate 62, rollers 72 would be brought into contact with backing plate 62 and with upper plate 73. Thus, stresses are absorbed by the whole cross-section of the rollers and not merely by the stub-axles at both ends of said rollers. Similarly, a third series of rollers 74 with vertical axes are pivotally mounted in part 76 integral with supporting plate 64. In normal operation, there is a clearance between rollers 74 and the vertical surface 62a of plate 62. In case of earth tremors, the function of said rollers is to restrict any horizontal movement at right angles to the axis of duct 28 to an acceptable value.

Thus is obtained a system for supporting the movable pump-exchanger assembly, said system providing the mobility required for absorbing expansions in the direction of duct 28, the latter being itself so designed as to withstand any transient stresses resulting from components of the maximum earthquake contemplated for the site of the plant. Such a system permits to minimize the stresses applied to the connecting ducts between the vessel and the exchanger, while ensuring the stability of said exchanger in case of earth-tremors.

As already specified, such a supporting system could be applied both to the primary or intermediate exchangers of a reactor with loops, and to the pumps, when the latter are not integrated to the corresponding exchanger, as is usual in reactors with loops.

I claim:

1. A liquid metal cooled nuclear reactor comprising in combination
   (a) a vessel for receiving the reactor core and said liquid metal;
   (b) at least one heat exchanger for ensuring a heat exchange between said liquid metal and a second fluid;
   (c) a first duct for connecting said vessel with the inlet of the heat exchanger, said duct opening into said vessel above the core; and
   (d) a second duct for connecting said vessel with the outlet of said heat exchanger said vessel being provided, along the outer periphery thereof, with a first supporting means situated between said ducts said first duct being substantially rectilinear and horizontal and opening into said vessel above, and in the vicinity of, said first supporting means, said heat exchanger provided with a second supporting means at a level that is above the reactor support level wherein the stresses resulting from differential expansions of the ducts are reduced and constituted by at least two supporting members diametrically opposed with respect to the vertical axis of the exchanger outer cover, each of said supporting members comprising a horizontal fixed support plate, a horizontal backing plate integral with said exchanger and situated above said support plate, and a first plurality of rollers between said plates, the axes of revolution of said rollers being at right angles to the direction of said tubing; and wherein each supporting member comprises a second series of rollers parallel to said first series, said second rollers being arranged above said backing plate and bound to said supporting plate so mounted that there is a clearance between said rollers and said backing plate such supporting member also comprising a horizontal upper plate for the abutment of the rollers of said second series, said plate being integral with said support plate and so arranged that whenever the heat exchanger assumes an abnormal movement, said rollers of the second series come into abutment with said horizontal upper plate as well as a third series of rollers with vertical axis with respect to the reactor, adapted to form an abutment, in the case of horizontal movements, between said backing plate and a vertical extension of said supporting plate.

2. A nuclear reactor as in claim 1, wherein said vessel comprises a main outer vessel provided with said first supporting means, a primary inner vessel coaxial with said outer vessel, said primary vessel containing said core and provided with third supporting means constituted by first parts integral with the main vessel inner surface and by second parts integral with the primary vessel outer surface and resting on said first parts, said third supporting means being situated at said predetermined level, wherein said first duct opens into said primary vessel above said core and passes through the annular space between said main vessel and said primary vessel, and wherein said second duct opens into said annular space situated at a lower level below the support means.

3. A nuclear reactor as in claim 1, wherein the centers of gravity of both the heat exchanger and the reactor vessel are situated below the respective supporting levels.

* * * * *